United States Patent
Zlotnik et al.

(10) Patent No.: US 12,554,278 B2
(45) Date of Patent: Feb. 17, 2026

(54) VOLTAGE REGULATION SYSTEM

(71) Applicant: Micron Technology, Inc., Boise, ID (US)

(72) Inventors: Leon Zlotnik, Camino, CA (US); Leonid Minz, Beer Sheva (IL); Ekram H. Bhuiyan, Sunnyvale, CA (US)

(73) Assignee: Micron Technology, Inc., Boise, ID (US)

( * ) Notice: Subject to any disclaimer, the term of this patent is extended or adjusted under 35 U.S.C. 154(b) by 212 days.

(21) Appl. No.: 17/874,867

(22) Filed: Jul. 27, 2022

(65) Prior Publication Data

US 2024/0036596 A1 Feb. 1, 2024

(51) Int. Cl.
*G05F 1/575* (2006.01)
*G11C 5/14* (2006.01)

(52) U.S. Cl.
CPC .............. *G05F 1/575* (2013.01); *G11C 5/147* (2013.01)

(58) Field of Classification Search
CPC ...... G05F 1/575; G11C 5/147; G11C 11/4074
See application file for complete search history.

(56) References Cited

U.S. PATENT DOCUMENTS

| | | | |
|---|---|---|---|
| 3,430,070 A | 2/1969 | Marshall, Jr. et al. | |
| 5,179,295 A | 1/1993 | Mattison et al. | |
| 5,767,717 A | 6/1998 | Schorn et al. | |
| 9,599,672 B2 | 3/2017 | Abhishek et al. | |
| 11,347,251 B1* | 5/2022 | Kwon | G05F 1/575 |
| 2006/0294282 A1 | 12/2006 | Warner | |
| 2015/0357815 A1* | 12/2015 | Luh | H02J 7/0063 |
| | | | 307/31 |
| 2020/0243119 A1* | 7/2020 | Spica | G06F 11/0727 |
| 2022/0337238 A1* | 10/2022 | Onódy et al. | H03K 17/145 |
| 2022/0391108 A1* | 12/2022 | Kim | G06F 1/3296 |
| 2022/0404853 A1* | 12/2022 | Kim | G05F 1/575 |

* cited by examiner

*Primary Examiner* — Jerome Leboeuf
(74) *Attorney, Agent, or Firm* — Brooks, Cameron & Huebsch, PLLC (57) ABSTRACT

A first voltage regulation circuit is coupled to a second voltage regulation circuit. Control circuitry is coupled to the first voltage regulation circuit and the second voltage regulation circuit. The control circuitry determines that a signal criterion is met, and controls application of a voltage signal generated by the second voltage regulation circuit to stabilize a voltage signal generated by the first voltage regulation circuit.

14 Claims, 5 Drawing Sheets

VOLTAGE REGULATION SYSTEM

TECHNICAL FIELD

Embodiments of the disclosure relate generally to digital logic circuits, and more specifically, relate to a voltage regulation system.

BACKGROUND

A memory sub-system can include one or more memory devices that store data. The memory devices can be, for example, non-volatile memory devices and volatile memory devices. In general, a host system can utilize a memory sub-system to store data at the memory devices and to retrieve data from the memory devices.

BRIEF DESCRIPTION OF THE DRAWINGS

The present disclosure will be understood more fully from the detailed description given below and from the accompanying drawings of various embodiments of the disclosure.

DETAILED DESCRIPTION

Aspects of the present disclosure are directed to a voltage regulation system and, in particular, to memory sub-systems that include a voltage regulation system. A memory sub-system can be a storage system, storage device, a memory module, or a combination of such. An example of a memory sub-system is a storage system such as a solid-state drive (SSD). Examples of storage devices and memory modules are described below in conjunction with FIG. 1, et alibi. In general, a host system can utilize a memory sub-system that includes one or more components, such as memory devices that store data. The host system can provide data to be stored at the memory sub-system and can request data to be retrieved from the memory sub-system.

Power in such memory sub-systems can be provided by various power supplies, which generally supply a voltage signal or current signal to one or more voltage regulators. The voltage regulator(s) then seek to maintain a stable output voltage and provide the stable output voltage to various components of the memory sub-system. Generally, the voltage regulator(s) are able to maintain and provide the stable output voltage under normal operating conditions of the memory sub-system; however, due to various factors such as process variation in components of the memory sub-system, operational conditions of the memory sub-system, and/or sudden changes in loads experienced by components during operation of the memory sub-system, among other factors, the voltage regulator(s) can sometimes temporarily fail to supply a stable voltage to components of the memory sub-system.

For example, a voltage drop (e.g., IR drop) can occur as a voltage signal traverses signal paths in a memory sub-system. In some instances, the voltage drop can lead to scenarios in which a voltage regulator is unable to provide an accurate stable voltage to one or more components of the memory sub-system. In order to remedy such scenarios, some conventional approaches may increase the size of the voltage regulator(s) to utilize larger, more powerful voltage regulators to supply larger than theoretically necessary voltages across a signal path to ensure that adequate voltage is provided to the components of the memory sub-system. However, increasing the power output of the voltage regulator can be costly in terms of power consumption in the memory sub-system, heat generation in the memory sub-system, and/or space (e.g., real estate) consumed in the memory sub-system. These issues can be further exacerbated in certain form factor memory sub-systems, particularly as memory sub-system development trends toward smaller devices that feature densely packed components.

In order to address these and other deficiencies of current approaches, embodiments of the present disclosure provide for a secondary ("companion") voltage regulator to operate when needed to provide additional voltage to components of the memory sub-system. As described in more detail herein, the secondary voltage regulator can operate in conjunction with a main voltage regulator to provide an injection of voltage to one or more components of the memory sub-system when it is determined that the main voltage regulator is providing insufficient voltage to such components.

For example, if an abrupt change in current across a signal path of the memory sub-system is detected, the secondary voltage regulator can become operational to supply additional voltage across the signal path to allow for components coupled to the signal path to receive a stable, expected voltage. By operating the secondary voltage regulator as needed to provide a voltage boost to components of the memory sub-system, power savings are realized in comparison to the approaches described above, thereby yielding an improvement to the memory sub-system. Further, heat generation in the memory sub-system is reduced in comparison to the approaches described above thereby reducing the quantity and/or size of thermal dissipation components in the memory sub-system thereby yielding further improvements to the memory sub-system.

Figure 1:
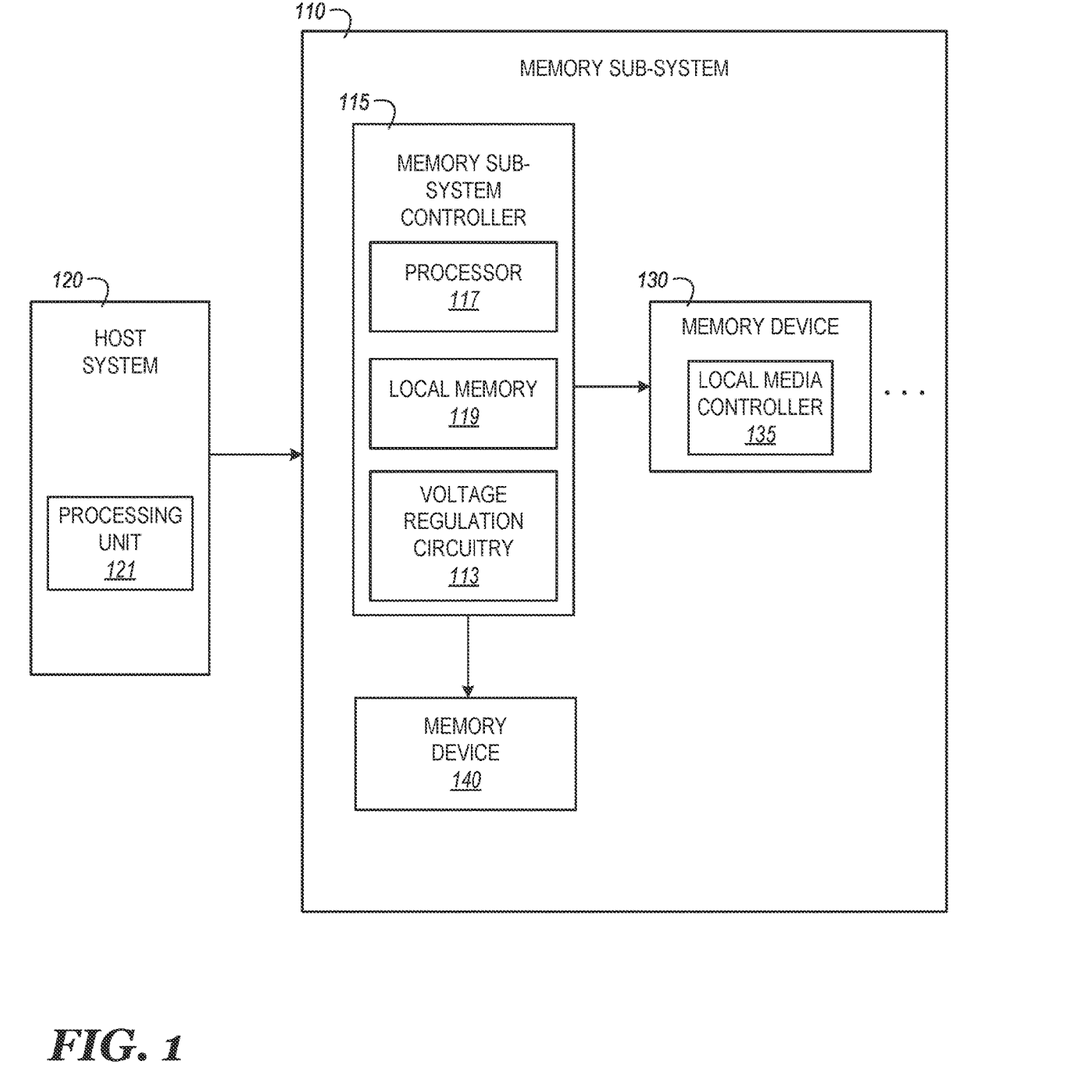
FIG. 1 illustrates an example computing system that includes a memory sub-system in accordance with some embodiments of the present disclosure.

FIG. 1 illustrates an example computing system 100 that includes a memory sub-system 110 in accordance with some embodiments of the present disclosure. The memory sub-system 110 can include media, such as one or more volatile memory devices (e.g., memory device 140), one or more non-volatile memory devices (e.g., memory device 130), or a combination of such.

A memory sub-system 110 can be a storage device, a memory module, or a hybrid of a storage device and memory module. Examples of a storage device include a solid-state drive (SSD), a flash drive, a universal serial bus (USB) flash drive, an embedded Multi-Media Controller (eMMC) drive, a Universal Flash Storage (UFS) drive, a secure digital (SD) card, and a hard disk drive (HDD). Examples of memory modules include a dual in-line memory module (DIMM), a small outline DIMM (SO-DIMM), and various types of non-volatile dual in-line memory modules (NVDIMMs).

The computing system 100 can be a computing device such as a desktop computer, laptop computer, server, network server, mobile device, a vehicle (e.g., airplane, drone, train, automobile, or other conveyance), Internet of Things (IoT) enabled device, embedded computer (e.g., one included in a vehicle, industrial equipment, or a networked commercial device), or such computing device that includes memory and a processing device.

In other embodiments, the voltage sensing circuit 100 can be deployed on, or otherwise included in a computing device such as a desktop computer, laptop computer, server, network server, mobile computing device, a vehicle (e.g., airplane, drone, train, automobile, or other conveyance), Internet of Things (IoT) enabled device, embedded computer (e.g., one included in a vehicle, industrial equipment, or a networked commercial device), or such computing device that includes memory and a processing device. As used herein, the term "mobile computing device" generally refers to a handheld computing device that has a slate or phablet form factor. In general, a slate form factor can include a display screen that is between approximately 3 inches and 5.2 inches (measured diagonally), while a phablet form factor can include a display screen that is between approximately 5.2 inches and 7 inches (measured diagonally). Examples of "mobile computing devices" are not so limited, however, and in some embodiments, a "mobile computing device" can refer to an IoT device, among other types of edge computing devices.

The computing system 100 can include a host system 120 that is coupled to one or more memory sub-systems 110. In some embodiments, the host system 120 is coupled to different types of memory sub-system 110. FIG. 1 illustrates one example of a host system 120 coupled to one memory sub-system 110. As used herein, "coupled to" or "coupled with" generally refers to a connection between components, which can be an indirect communicative connection or direct communicative connection (e.g., without intervening components), whether wired or wireless, including connections such as electrical, optical, magnetic, and the like.

The host system 120 can include a processor chipset and a software stack executed by the processor chipset. The processor chipset can include one or more cores, one or more caches, a memory controller (e.g., an SSD controller), and a storage protocol controller (e.g., PCIe controller, SATA controller). The host system 120 uses the memory sub-system 110, for example, to write data to the memory sub-system 110 and read data from the memory sub-system 110.

The host system 120 includes a processing unit 121. The processing unit 121 can be a central processing unit (CPU) that is configured to execute an operating system. In some embodiments, the processing unit 121 comprises a complex instruction set computer architecture, such an x86 or other architecture suitable for use as a CPU for a host system 120.

The host system 120 can be coupled to the memory sub-system 110 via a physical host interface. Examples of a physical host interface include, but are not limited to, a serial advanced technology attachment (SATA) interface, a peripheral component interconnect express (PCIe) interface, universal serial bus (USB) interface, Fibre Channel, Serial Attached SCSI (SAS), Small Computer System Interface (SCSI), a double data rate (DDR) memory bus, a dual in-line memory module (DIMM) interface (e.g., DIMM socket interface that supports Double Data Rate (DDR)), Open NAND Flash Interface (ONFI), Double Data Rate (DDR), Low Power Double Data Rate (LPDDR), or any other interface. The physical host interface can be used to transmit data between the host system 120 and the memory sub-system 110. The host system 120 can further utilize an NVM Express (NVMe) interface to access components (e.g., memory devices 130) when the memory sub-system 110 is coupled with the host system 120 by the PCIe interface. The physical host interface can provide an interface for passing control, address, data, and other signals between the memory sub-system 110 and the host system 120. FIG. 1 illustrates a memory sub-system 110 as an example. In general, the host system 120 can access multiple memory sub-systems via the same communication connection, multiple separate communication connections, and/or a combination of communication connections.

The memory devices 130, 140 can include any combination of the different types of non-volatile memory devices and/or volatile memory devices. The volatile memory devices (e.g., memory device 140) can be, but are not limited to, random access memory (RAM), such as dynamic random-access memory (DRAM) and synchronous dynamic random access memory (SDRAM).

Some examples of non-volatile memory devices (e.g., memory device 130) include negative-and (NAND) type flash memory and write-in-place memory, such as three-dimensional cross-point ("3D cross-point") memory device, which is a cross-point array of non-volatile memory cells. A cross-point array of non-volatile memory can perform bit storage based on a change of bulk resistance, in conjunction with a stackable cross-gridded data access array. Additionally, in contrast to many flash-based memories, cross-point non-volatile memory can perform a write in-place operation, where a non-volatile memory cell can be programmed without the non-volatile memory cell being previously erased. NAND type flash memory includes, for example, two-dimensional NAND (2D NAND) and three-dimensional NAND (3D NAND).

Each of the memory devices 130, 140 can include one or more arrays of memory cells. One type of memory cell, for example, single level cells (SLC) can store one bit per cell. Other types of memory cells, such as multi-level cells (MHLCs), triple level cells (TLCs), quad-level cells (QLCs), and penta-level cells (PLC) can store multiple bits per cell. In some embodiments, each of the memory devices 130 can include one or more arrays of memory cells such as SLCs, MLCs, TLCs, QLCs, or any combination of such. In some embodiments, a particular memory device can include an SLC portion, and an MLC portion, a TLC portion, a QLC portion, or a PLC portion of memory cells. The memory cells of the memory devices 130 can be grouped as pages that can refer to a logical unit of the memory device used to store data. With some types of memory (e.g., NAND), pages can be grouped to form blocks.

Although non-volatile memory components such as three-dimensional cross-point arrays of non-volatile memory cells and NAND type memory (e.g., 2D NAND, 3D NAND) are described, the memory device 130 can be based on any other type of non-volatile memory or storage device, such as such as, read-only memory (ROM), phase change memory (PCM), self-selecting memory, other chalcogenide based memories, ferroelectric transistor random-access memory (FeTRAM), ferroelectric random access memory (FeRAM), magneto random access memory (MRAM), Spin Transfer Torque (STT)-MRAM, conductive bridging RAM (CBRAM), resistive random access memory (RRAM), oxide based RRAM (OxRAM), negative-or (NOR) flash memory, and electrically erasable programmable read-only memory (EEPROM).

The memory sub-system controller 115 (or controller 115 for simplicity) can communicate with the memory devices 130 to perform operations such as reading data, writing data, or erasing data at the memory devices 130 and other such operations. The memory sub-system controller 115 can include hardware such as one or more integrated circuits and/or discrete components, a buffer memory, or a combination thereof. The hardware can include digital circuitry with dedicated (i.e., hard-coded) logic to perform the operations described herein. The memory sub-system controller 115 can be a microcontroller, special purpose logic circuitry (e.g., a field programmable gate array (FPGA), an application specific integrated circuit (ASIC), etc.), or other suitable processor.

The memory sub-system controller 115 can include a processor 117 (e.g., a processing device) configured to execute instructions stored in a local memory 119. In the illustrated example, the local memory 119 of the memory sub-system controller 115 includes an embedded memory configured to store instructions for performing various processes, operations, logic flows, and routines that control operation of the memory sub-system 110, including handling communications between the memory sub-system 110 and the host system 120.

In some embodiments, the local memory 119 can include memory registers storing memory pointers, fetched data, etc. The local memory 119 can also include read-only memory (ROM) for storing micro-code. While the example memory sub-system 110 in FIG. 1 has been illustrated as including the memory sub-system controller 115, in another embodiment of the present disclosure, a memory sub-system 110 does not include a memory sub-system controller 115, and can instead rely upon external control (e.g., provided by an external host, or by a processor or controller separate from the memory sub-system).

In general, the memory sub-system controller 115 can receive commands or operations from the host system 120 and can convert the commands or operations into instructions or appropriate commands to achieve the desired access to the memory device 130 and/or the memory device 140. The memory sub-system controller 115 can be responsible for other operations such as wear leveling operations, garbage collection operations, error detection and error-correcting code (ECC) operations, encryption operations, caching operations, and address translations between a logical address (e.g., logical block address (LBA), namespace) and a physical address (e.g., physical block address, physical media locations, etc.) that are associated with the memory devices 130. The memory sub-system controller 115 can further include host interface circuitry to communicate with the host system 120 via the physical host interface. The host interface circuitry can convert the commands received from the host system into command instructions to access the memory device 130 and/or the memory device 140 as well as convert responses associated with the memory device 130 and/or the memory device 140 into information for the host system 120.

The memory sub-system 110 can also include additional circuitry or components that are not illustrated. In some embodiments, the memory sub-system 110 can include a cache or buffer (e.g., DRAM) and address circuitry (e.g., a row decoder and a column decoder) that can receive an address from the memory sub-system controller 115 and decode the address to access the memory device 130 and/or the memory device 140.

In some embodiments, the memory device 130 includes local media controllers 135 that operate in conjunction with memory sub-system controller 115 to execute operations on one or more memory cells of the memory devices 130. An external controller (e.g., memory sub-system controller 115) can externally manage the memory device 130 (e.g., perform media management operations on the memory device 130). In some embodiments, a memory device 130 is a managed memory device, which is a raw memory device combined with a local controller (e.g., local controller 135) for media management within the same memory device package. An example of a managed memory device is a managed NAND (MNAND) device.

The memory sub-system 110 can include voltage regulation circuitry 113. Although not shown in FIG. 1 so as to not obfuscate the drawings, the voltage regulation circuitry 113 can include various circuitry to facilitate aspects of the disclosure described herein. In some embodiments, the voltage regulation circuitry 113 can include special purpose circuitry in the form of an ASIC, FPGA, state machine, hardware processing device, and/or other logic circuitry that can allow the voltage regulation circuitry 113 to orchestrate and/or perform operations to stabilize voltage signals, particularly with respect to a system-on-chip in accordance with the disclosure.

Figure 2:
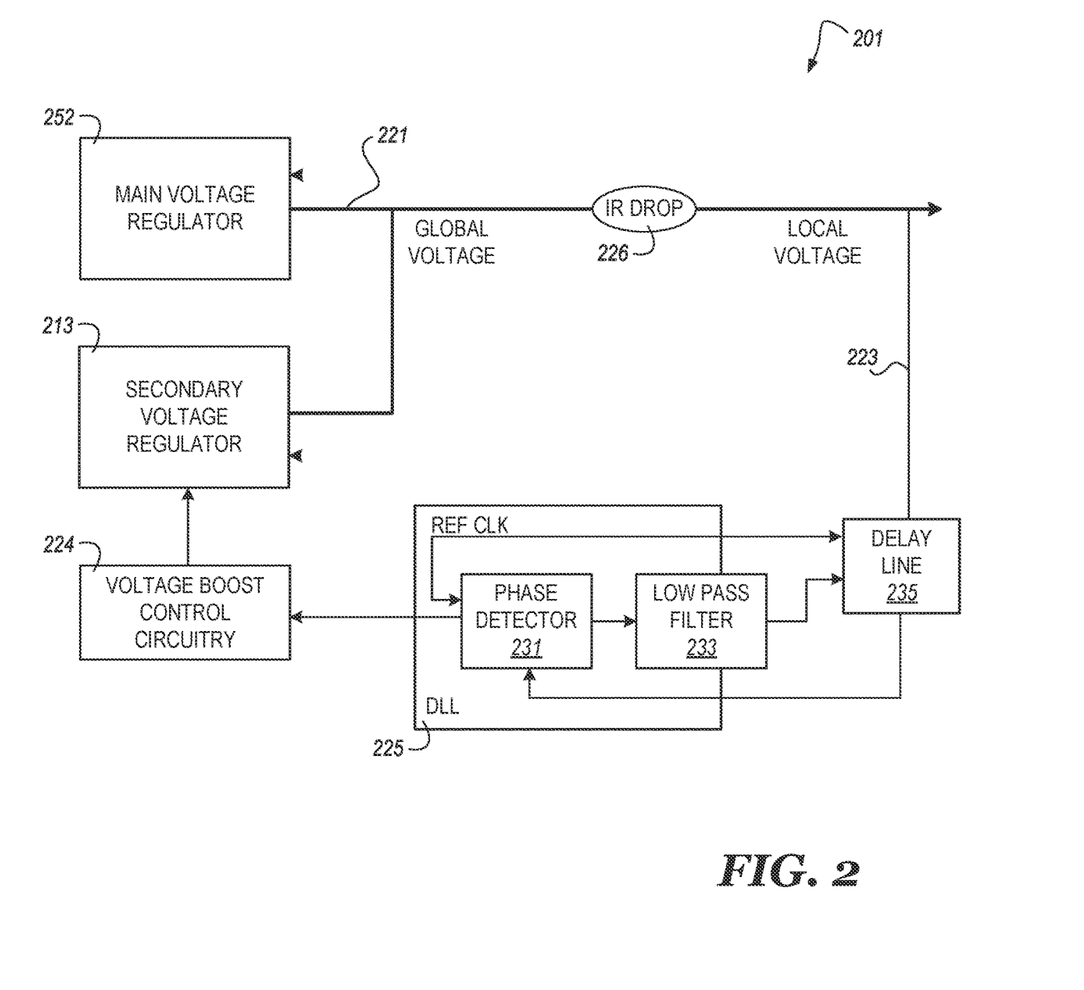
FIG. 2 illustrates an example of a voltage regulation system in accordance with some embodiments of the present disclosure.
Figure 3:
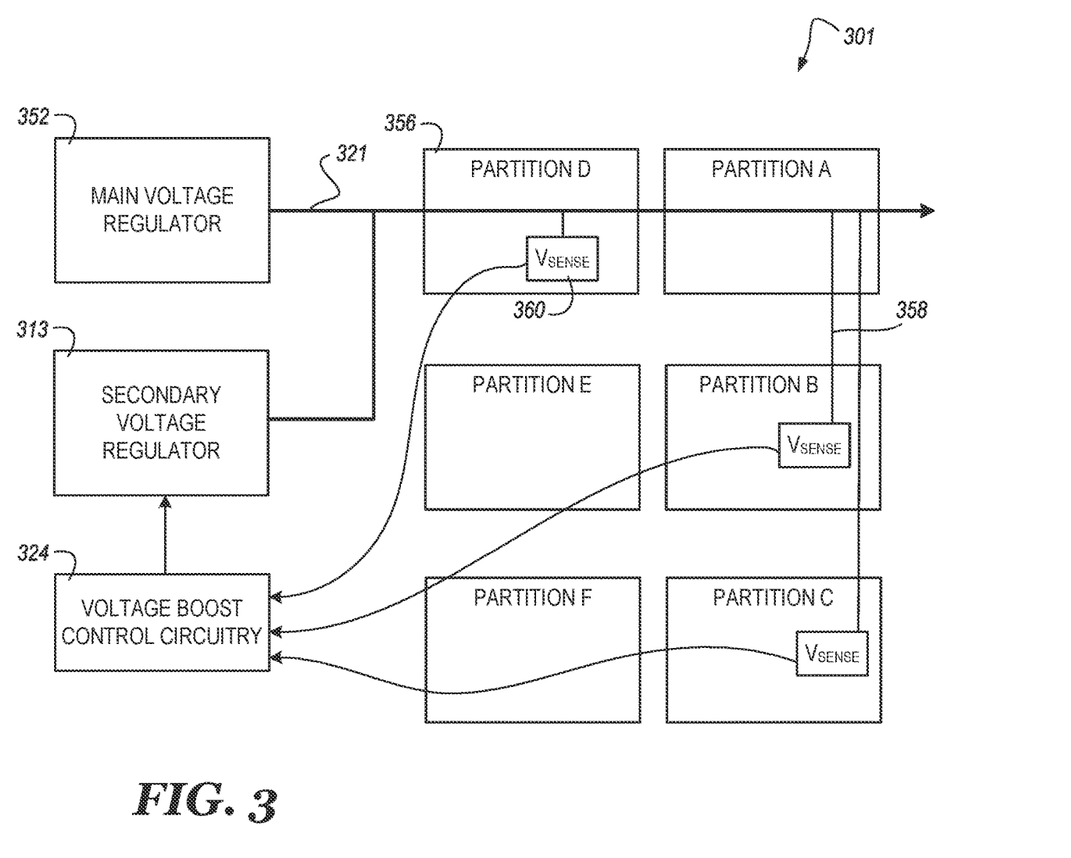
FIG. 3 illustrates another example of a voltage regulation system in accordance with some embodiments of the present disclosure.

The voltage regulation circuitry 113 can include a first voltage regulator (e.g., the main voltage regulator 252/352 illustrated in FIG. 2 and FIG. 3, herein), a second voltage regulator (e.g., the secondary voltage regulator 213/313 illustrated in FIG. 2 and FIG. 3, herein), and/or voltage boost control circuitry (e.g., the voltage boost control circuitry 224/324 illustrated in FIG. 2 and FIG. 3, herein) and/or the voltage regulation circuitry 113 can include a processing device to control operations performed by a first voltage regulator, a second voltage regulator, and/or voltage boost control circuitry that are described herein.

In some embodiments, the memory sub-system controller 115 includes at least a portion of the voltage regulation circuitry 113. For example, the memory sub-system controller 115 can include a processor 117 (processing device) configured to execute instructions stored in local memory 119 for performing the operations described herein. In some embodiments, the voltage regulation circuitry 113 is part of the host system 110, an application, or an operating system. The voltage regulation circuitry 113 can be resident on the memory sub-system 110 and/or the memory sub-system controller 115. As used herein, the term "resident on" refers to something that is physically located on a particular component. For example, the voltage regulation circuitry 113 being "resident on" the memory sub-system 110, for example, refers to a condition in which the hardware circuitry that comprises the voltage regulation circuitry 113 is physically located on the memory sub-system 110. The term "resident on" may be used interchangeably with other terms such as "deployed on" or "located on," herein.

FIG. 2 illustrates an example of a voltage regulation system 201 in accordance with some embodiments of the present disclosure. The example system 201, which can be referred to in the alternative as an "apparatus," includes a main voltage regulator 252, a secondary ("companion") voltage regulator 213, voltage boost control circuitry 224, and delay-locked loop component (DLL) 225. The DLL 225 can include, for example, phase detector circuitry 231 and filter circuitry, such as a low pass filter 233, which can be coupled to a delay line 235.

In some embodiments, the DLL 225 and the delay line 235 are powered by the "LOCAL VOLTAGE" (e.g., via the voltage supply line 223. The DLL 225 can determine a change (e.g., a derivative) in a current or voltage based on inputs received from the delay line 235, which can be processed by the phase detector 231 and/or the low pass filter 233. In some embodiments, an output of the phase detector 233 is received by the voltage boost control circuitry 224 which, in turn can provide signaling to the secondary voltage regulator 213 to control operation of the secondary voltage regulator 213.

The main voltage regulator 252 and the secondary voltage regulator 213 are coupled to a voltage signal line 221 (e.g., a rail to provide a power supply signal or "supply voltage signal" to one or more electrical components to power such components). The voltage signal line 221 can be split into one or more voltage supply lines, such as the voltage supply line 223 and/or the voltage supply line 358 illustrated in FIG. 3, herein.

As the voltage signal generated by the main voltage regulator 252 traverses the voltage signal line 221, the magnitude of the voltage signal is reduced, as indicated by the IR drop 226. Accordingly, under some conditions, a "GLOBAL VOLTAGE" signal can have a greater magnitude than a "LOCAL VOLTAGE" signal. When the magnitude of the voltage signal is decreased, for example due to the IR drop 226, an increase in a current associated with the voltage signal can be detected using the DLL 225. Conversely, when the magnitude of the voltage signal is increased, a decrease in the current associated with the voltage signal can be detected using the DLL 225. Embodiments are not limited to detection of such a change using the DLL 225, however, and other circuitries and/or methodologies, such as utilization of a voltage sensor (e.g., the $V_{SENSE}$ circuit 360 illustrated in FIG. 3) and/or a current sensor, among other possibilities are contemplated within the scope of the disclosure. In some embodiments, the change in current corresponds to a derivative of a waveform representing the magnitude of the current.

In some embodiments, characteristics of the physical components of the voltage regulation system 201 and/or components coupled thereto can further exacerbate the IR drop 226. For example, higher than expected currents that can be present due to leaky silicon and/or dynamic peak currents, among other possibilities, can lead to scenarios in which the main voltage regulator 252 is unable to consistently provide adequate voltage to the voltage signal line 221. As described above, some conventional approaches may attempt to rectify this by increasing the size, complexity, and/or power available to the main voltage regulator 225.

However, as mentioned above, this can be costly in terms of space, power consumption, and/or heat dissipation, among other factors. Further, because it may only be necessary to temporarily boost the voltage to the voltage signal line 221, increasing the size, complexity, and/or power available to the main voltage regulator 252 may be unnecessary. Accordingly, aspects of the present disclosure provide the secondary ("companion") voltage regulator 213 that is configured to provide a boost of voltage (or current) to stabilize the voltage signal on the voltage signal line 221.

In addition to, or in the alterative, at least one of the main voltage regulator 252 and the secondary voltage regulator 213 can be provided in the voltage regulation system 201 such that power dissipation characteristics and/or electrical noise generation characteristics of the main voltage regulator 252 and/or the secondary voltage regulator 213 are at least marginally optimized for the voltage regulation system 201. For example, if a comparatively more powerful main voltage regulator 252 (e.g., in terms of physical size, power output, etc.) is deployed in the voltage regulation system 201, characteristics of the secondary voltage regulator 213 may be chosen such that the secondary voltage regulator 213 is only activated to control peak power dissipation, which allows for the secondary voltage regulator 213 to be comparatively smaller (e.g., in terms of physical size, power output, etc.). As another example, characteristics of the secondary voltage regulator 213 may be chosen such that the secondary voltage regulator 213 operates at a relatively low noise level in scenarios in which noise concerns in the voltage regulation system 201 may be important. In any event, by providing the second voltage regulator 213 in a manner consistent with desired parameters (e.g., peak power dissipation, noise generation, physical size, thermal dissipation, reaction time to voltage or current overshoots or undershoots, etc.) of the voltage regulation system 201 in which the secondary voltage regulator 213 is deployed, embodiments of the present disclosure provide improvements over the conventional approaches mentioned above.

In some embodiments, the secondary voltage regulator 213 can provide a higher voltage than the main voltage regulator 252. As an example, the secondary voltage regulator 213 may be able to supply around 0.85 Volts (V) and the main voltage regulator 252 may be configured to supply around 0.8 V, although embodiments are not so limited. In some embodiments, the secondary voltage regulator 213 and the main voltage regulator 252 can be configured to receive different voltages (e.g., to provide power to secondary voltage regulator 213 and the main voltage regulator 252) from different power supplies, although embodiments are not so limited.

In some embodiments, the main voltage regulator 252 operates alone (e.g., the secondary voltage regulator 213 is not in operation) until a threshold current level is detected in the voltage regulation system 201. As an illustrative, non-limiting example, the main voltage regulator 252 may operate by itself to regulate the voltage applied to the voltage signal line 221 until a current of 800 milliamps (mA) is detected. Once this threshold current is detected, the secondary voltage regulator 213 can become operational to provide additional voltage and/or current to the voltage signal line 221 as needed. The amount of current supplied by the secondary voltage regulator 213 can be a function of a ratio of the increase in detected current. For example, for each additional 1 mA detected above 800 mA (in this non-limiting illustrative example), a compensation of 0.5 mA can be handled by the secondary voltage regulator 213 and/or a compensation of 0.5 mA can be handled by the main voltage regulator 252. Embodiments are not limited to these specifically enumerated examples, however, and the ratio of the increase in detected current can be handled by the main voltage regulator 252 and the secondary voltage regulator 213 in any ratio (e.g., for every mA, 0.8 mA can be handled by the secondary voltage regulator 213 and 0.2 mA can be handled by the main voltage regulator 252, etc.).

In a non-limiting example, an apparatus (e.g., the computing system 100 illustrated in FIG. 1, the voltage regulation circuitry 113 illustrated in FIG. 1, the voltage regulation systems 201/301 illustrated in FIG. 2 and FIG. 3, and/or components thereof), includes a first voltage regulation circuit (e.g., the main voltage regulator 252) and a second voltage regulation circuit (e.g., the secondary voltage regulator 213) coupled to the first voltage regulation circuit. The apparatus further includes control circuitry (e.g., the voltage boost control circuit 224) coupled to the first voltage regulation circuit and the second voltage regulation circuit. The control circuitry 224 is configured to determine that a signal criterion is met, and control application of a voltage signal generated by the second voltage regulation circuit 213 to stabilize a voltage signal generated by the first voltage regulation circuit 252. In some embodiments, the first voltage regulation circuit 252, the second voltage regulation circuit 213, and the control circuitry 224 can be resident and/or can comprise on a system-on-chip.

The signal criterion can be indicative of a change in a voltage or current being greater than or less than a threshold voltage or current change from a voltage or current utilized by components (e.g., the circuit portion areas 356 and/or the computing components described in connection with FIG. 3, herein) of the apparatus. For example, the signal criterion can correspond to a determination that a rate of change in a current applied to components of the apparatus has met or exceeded a threshold rate of change in the current applied to such components. In conventional approaches, a rate of change of such current meeting or exceeding a threshold rate of change in the current applied to the components can lead to scenarios in which a voltage supplied to the components is either too low or too high, which can cause the components to function at less than ideally or, in a worst-case scenario, to not function at all.

In contrast, in embodiments disclosed herein, the control circuitry 224 is configured to stabilize the voltage signal generated by the first voltage regulation circuit to provide voltage drop compensation for a component coupled to the apparatus and/or the control circuitry 224 is configured to stabilize the voltage signal generated by the first voltage regulation circuit 252 to mitigate a voltage overshoot (or a voltage undershoot) involving a component coupled to the apparatus. As described herein, such stabilization of the voltage signal is provided by the secondary voltage regulator 213.

Continuing with this non-limiting example, in some embodiments, the apparatus further includes delay circuitry (e.g., the DLL 225) coupled to the control circuitry 224. The control circuitry 224 can be configured to receive signaling from the delay circuitry 225 and control application of the signal generated by the second voltage regulation circuit 213 based on the signaling received from the delay circuitry 225. Embodiments are not so limited, however, and the apparatus may further include a voltage sensor (e.g., the voltage sensor 360 illustrated in FIG. 3, herein) coupled to the control circuitry 224. The control circuitry 224 can be configured to receive signaling from the voltage sensor and control application of the signal generated by the second voltage regulation circuit 213 based on the signaling received from the voltage sensor.

In embodiments, the control circuitry 224 can control application of a voltage signal generated by the first voltage regulation circuit 252 and application of the voltage signal generated by the second voltage regulation circuit 213 by increasing or decreasing an output voltage of the first voltage regulation circuit 252 and/or an output voltage of the second voltage regulation circuit 213 according to a ratio that is based on a magnitude of the change in the current associated with the apparatus or the change in the voltage associated with the apparatus. As described above, the ratio can be a function of a ratio of the increase in detected current in the voltage regulation system 201 or a portion thereof.

FIG. 3 illustrates another example of a voltage regulation system 301 in accordance with some embodiments of the present disclosure. The example system 301, which can be referred to in the alternative as an "apparatus," includes a main voltage regulator 352, a secondary voltage regulator 313, and voltage boost control circuitry 324. The main voltage regulator 352, the secondary voltage regulator 313, and the voltage boost control circuitry 324 can be analogous to the main voltage regulator 252, the secondary voltage regulator 213, and the voltage boost control circuitry 224 illustrated in FIG. 2.

As shown in FIG. 3, the system 301 includes a voltage signal line 321 (which can be analogous to the voltage signal line 221 illustrated in FIG. 2) coupled to the main voltage regulator 352 and the secondary voltage regulator 313. The voltage signal line 321 be split into one or more voltage supply lines 358 that can provide power to the circuit portion areas 356 and/or to the voltage sensors 360.

In FIG. 3, the system 301 includes a number of circuit portion areas 356 (e.g., partitions A-F) that have power supplied thereto via the main voltage regulator 352 and/or the secondary voltage regulator 313 through the voltage supply lines 358. The circuit portion areas 356 can be logic blocks that can include various hardware that form one or more cores (e.g., "intellectual property (IP) cores"). As used herein, a "core" or "IP core" generally refers to one or more blocks of data and/or logic that form constituent components of an application-specific integrated circuit or field-programmable gate array. The circuit portion areas can be designed, built, and/or otherwise configured to perform specific tasks and/or functions within the systems described herein. In some embodiments, the main voltage regulator 352, the secondary voltage regulator 313, and/or the voltage boost control 324 can take an action (or cause an action to be taken) to track, limit, adjust or manipulate the voltage signals applied to the voltage signal line 321 and/or the voltage supply lines 358 to provide voltage manipulation to the circuit portion areas 356.

As shown in FIG. 3, the circuit portion areas 356 can include voltage sensors 360 ("$V_{SENSE}$"). The voltage sensors 360 can include various hardware circuitry and/or circuitry components to detect voltage levels and/or current levels applied to the circuit portion areas 356 via the voltage signal line 321 and/or the voltage supply lines 358. The voltage sensors can be configured to apply signaling indicative of a change in the current or the voltage, or both, associated with the voltage signal line 321 and/or the voltage supply lines 358 to the voltage boost control 324 in a similar manner as described above in connection with the discussion of the DLL 225 of FIG. 2. In response to receipt of such signaling, the voltage boost control 324 can control application of voltages from the secondary voltage regulator 313 to stabilize a voltage signal applied to the voltage signal line 321.

Although not explicitly illustrated in FIG. 3, the voltage regulation system 301 can be coupled to one or more computing components. The computing components are generally external to the voltage regulation system 301 (i.e., the computing components are physically distinct from a chip, such a SoC that, at minimum, the voltage regulation system 301 is deployed on) but are communicatively couplable to the voltage regulation system 301 such that signaling can be exchanged between the voltage regulation system and the computing components. Non-limiting examples of the computing components can include controllers, memory devices, graphics processing units, processors/co-processors, and/or logic blocks, among others that are deployed on a memory sub-system (e.g., the memory sub-system 110 illustrated in FIG. 1, herein) in which the voltage regulation system 301 operates.

In a non-limiting example, a system (e.g., the computing system 100 illustrated in FIG. 1, the voltage regulation circuitry 113 illustrated in FIG. 1, the voltage regulation systems 201/301 illustrated in FIG. 2 and FIG. 3, and/or components thereof), includes a first voltage regulation circuit (e.g., the main voltage regulator 352) and a second voltage regulation circuit (e.g., the secondary voltage regulator 213) coupled to the first voltage regulation circuit. A circuit portion area 358 is coupled via a voltage supply line 321 to the first voltage regulation circuit 352 and the second voltage regulation circuit 313.

Control circuitry (e.g., the voltage boost control circuitry 324) is coupled to the first voltage regulation circuit 352 and the second voltage regulation circuit 313. Continuing with this non-limiting example, sensor circuitry (e.g., the DLL 225 illustrated in FIG. 2, $V_{SENSE}$ 360 illustrated in FIG. 3, etc.) is coupled to the circuit portion area 360. The sensor circuitry is configured to detect a change in a current or a voltage, or both, associated with the voltage supply line 321 and apply signaling indicative of the change in the current or the voltage, or both, associated with the voltage supply line 321 to the control circuitry 324. In such examples, the control circuitry 324 is configured to control application of a voltage signal generated by the second voltage regulation circuit 313 to stabilize a voltage signal applied to the voltage supply line 321.

In some embodiments, the control circuitry 324 is configured to control application of the voltage signal generated by the second voltage regulation circuit 313 to stabilize the voltage signal applied to the voltage supply line 321 to provide voltage drop compensation for the circuit portion area 360. Embodiments are not so limited, however, and the control circuitry 324 can be configured to control application of the voltage signal generated by the second voltage regulation circuit 313 to stabilize the voltage signal applied to the voltage supply line 321 to mitigate a voltage overshoot involving the circuit portion area 360. Further, in some embodiments, the control circuitry 324 is configured to control application of a voltage signal generated by the first voltage regulation circuit 352 to stabilize the voltage signal applied to the voltage supply line 321.

When the detected change in the current or the voltage, or both, comprises a detected change in the current associated with the voltage supply line 321, the control circuitry 324 is further configured to control application of a voltage signal generated by the first voltage regulation circuit 352 and control application of the voltage signal generated by the first voltage regulation circuit 352 and the second voltage regulation circuit 313 by increasing or decreasing an output voltage of the first voltage regulation circuit 352 and the second voltage regulation circuit 313 according to a ratio that is based on a magnitude of the detected change in the current associated with the voltage supply line 321.

When the detected change in the current or the voltage, or both, comprises a detected change in the voltage associated with the voltage supply line 321, the control circuitry 324 is further configured to control application of a voltage signal generated by the first voltage regulation circuit 352 and control application of the voltage signal generated by the first voltage regulation circuit 352 and the second voltage regulation circuit 313 by increasing or decreasing an output voltage of the first voltage regulation circuit 352 and the second voltage regulation circuit according to a ratio that is based on a magnitude of the detected change in the voltage associated with the voltage supply line 321.

Figure 5:
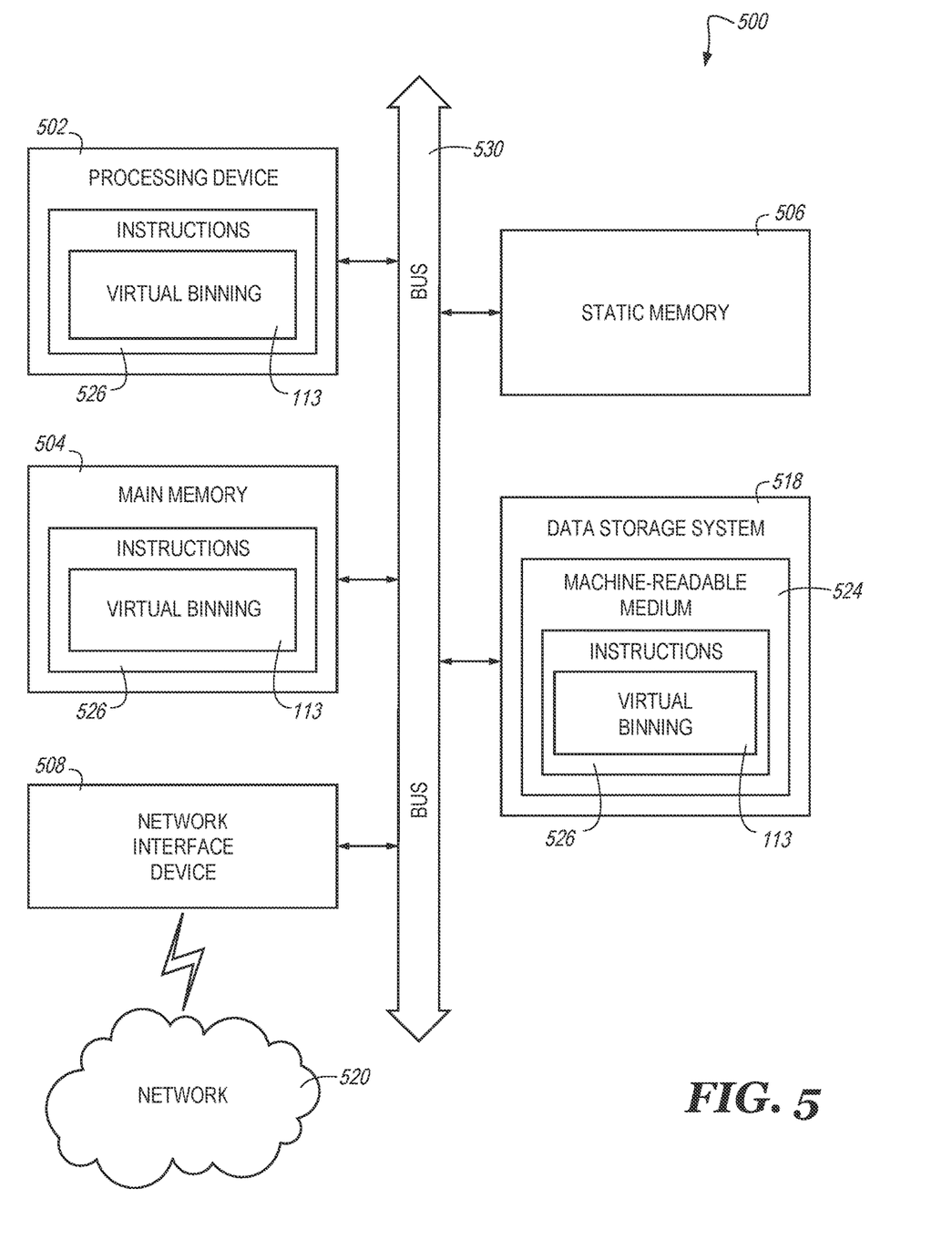
FIG. 5 is a block diagram of an example computer system in which embodiments of the present disclosure may operate.

In another non-limiting example, a non-transitory computer-readable storage medium (e.g., the machine-readable medium 524 illustrated in FIG. 5, herein) comprises (e.g., stores) instructions (e.g., the instructions 526 illustrated in FIG. 5, herein) that, when executed by a processing device (e.g., the voltage regulation circuitry 113, the voltage boost control 224 and/or the processing device 502 illustrated in FIG. 5, herein), cause the processing device to determine that a signal criterion is met and control application of a voltage signal generated by the second voltage regulation circuit 213/313 to stabilize a voltage signal generated by the first voltage regulation circuit 252/352, as described above.

In another non-limiting example, the a non-transitory computer-readable storage medium can comprise instructions to apply a first voltage signal by a first voltage regulation circuit (e.g., the main voltage regulator 252/352 illustrated in FIGS. 2-3) to a voltage supply line (e.g., the voltage supply lines 221/321 illustrated in FIGS. 2-3) coupled to a circuit portion area (e.g., the circuit portion area 356 illustrated in FIG. 3) of a memory sub-system (e.g., the memory sub-system 110 illustrated in FIG. 1) and detect a change in a current or a voltage, or both, associated with the voltage supply line coupled to the circuit portion area of the memory sub-system. In this example, the non-transitory computer-readable storage medium can comprise (e.g., store) instructions to apply a second voltage signal by a second voltage regulation circuit (e.g., the secondary voltage regulator 213/313 illustrated in FIGS. 2-3) to the voltage supply line coupled to the circuit portion area of a memory sub-system in response to detecting the change in the current or the voltage, or both, associated with the voltage supply line coupled to the circuit portion area of the memory sub-system.

Figure 4:
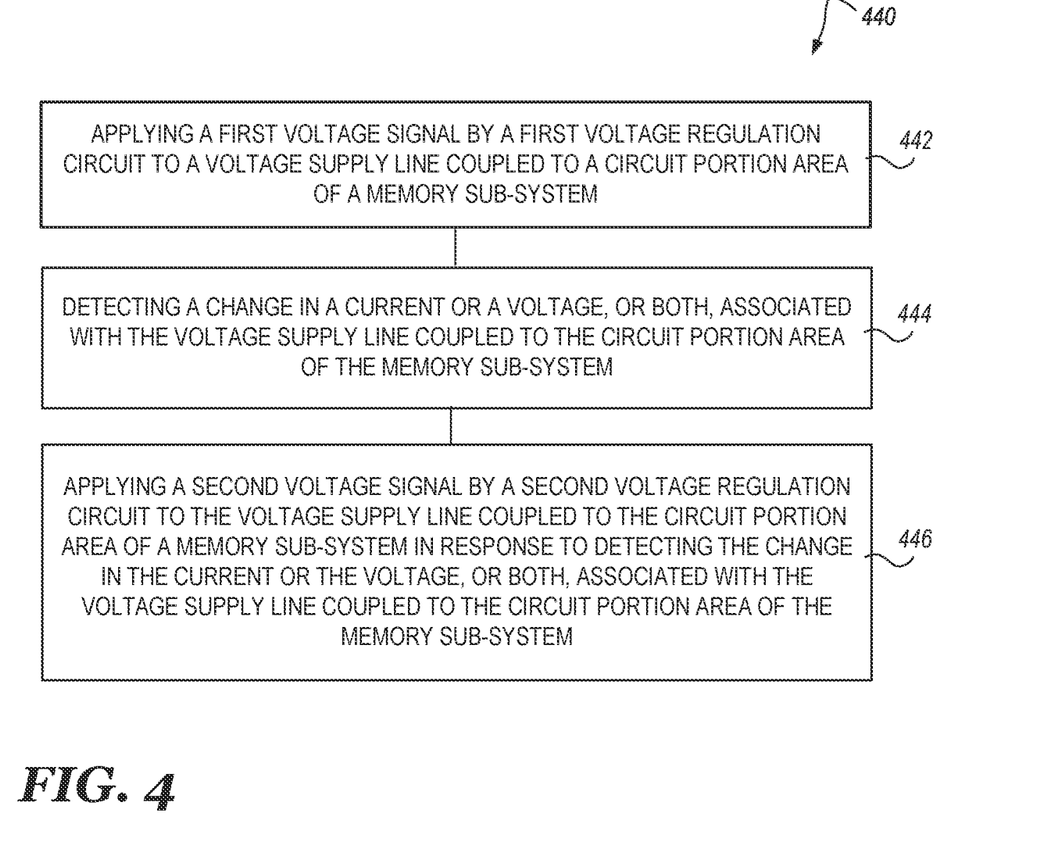
FIG. 4 is a flow diagram corresponding to a method for a voltage regulation system in accordance with some embodiments of the present disclosure.

FIG. 4 is a flow diagram corresponding to a method 440 for a voltage regulation system in accordance with some embodiments of the present disclosure. The method 440 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 440 is performed by the voltage regulation circuitry 113 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 442, the method 440 includes applying a first voltage signal by a first voltage regulation circuit (e.g., the main voltage regulator 252/352 illustrated in FIG. 2 and FIG. 3, herein) to a voltage supply line (e.g., the voltage supply line 221/321 illustrated in FIG. 2 and FIG. 3, herein) coupled to a circuit portion area (e.g., a circuit portion area 356 illustrated in FIG. 3, herein) of a memory sub-system (e.g., the memory sub-system 110 illustrated in FIG. 1, herein).

At operation 444, the method 440 includes detecting a change in a current or a voltage, or both, associated with the voltage supply line coupled to the circuit portion area of the memory sub-system. In some embodiments, the method 440 includes detecting the change in the current or the voltage, or both, associated with the voltage supply line coupled to the circuit portion area of the memory sub-system by control circuitry (e.g., the voltage boost control circuitry 224/324 illustrated in FIG. 2 and FIG. 3, herein) coupled to the first voltage regulation device and the second voltage regulation device.

At operation 446, the method 440 includes applying a second voltage signal by a second voltage regulation circuit (e.g., the secondary voltage regulator 213/313 illustrated in FIG. 2 and FIG. 3, herein) to the voltage supply line coupled to the circuit portion area of the memory sub-system in response to detecting the change in the current or the voltage, or both, associated with the voltage supply line coupled to the circuit portion area of the memory subsystem. In some embodiments, the method 440 includes applying the second voltage signal by the second voltage regulation circuit to the voltage supply line to stabilize the first voltage signal. In such embodiments, the method 440 can include stabilizing the voltage signal generated by the first voltage regulation circuit to provide voltage drop compensation for a component coupled to the apparatus and/or to mitigate a voltage overshoot involving a component (e.g., one or more of the computing components discussed above in connection with FIG. 3) coupled to the apparatus.

The method 440 can further include receiving, by the control circuitry, signaling indicative of the change in the current or the voltage, or both, associated with the voltage supply line from a delay-locked loop component (e.g., the DLL 225 illustrated in FIG. 2, herein) coupled to the control circuitry and detecting, by the control circuitry, the change in the current or the voltage, or both, associated with the voltage supply line based on the signaling received from the delay-locked loop component. Embodiments are not so limited, however and the method 440 can include receiving, by the control circuitry, signaling indicative of the change in the current or the voltage, or both, associated with the voltage supply line from a voltage sensor (e.g., the voltage sensor 360 illustrated in FIG. 3, herein) coupled to the control circuitry and detecting, by the control circuitry, the change in the current or the voltage, or both, associated with the voltage supply line based on the signaling received from the voltage sensor.

FIG. 5 is a block diagram of an example computer system in which embodiments of the present disclosure may operate. For example, FIG. 5 illustrates an example machine of a computer system 500 within which a set of instructions, for causing the machine to perform any one or more of the methodologies discussed herein, can be executed. In some embodiments, the computer system 500 can correspond to a host system (e.g., the host system 120 of FIG. 1) that includes, is coupled to, or utilizes a memory sub-system (e.g., the memory sub-system 110 of FIG. 1) or can be used to perform the operations of a controller (e.g., to execute an operating system to perform operations corresponding to the voltage regulation circuitry 113 of FIG. 1). In alternative embodiments, the machine can be connected (e.g., networked) to other machines in a LAN, an intranet, an extranet, and/or the Internet. The machine can operate in the capacity of a server or a client machine in client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 500 includes a processing device 502, a main memory 504 (e.g., read-only memory (ROM), flash memory, dynamic random access memory (DRAM) such as synchronous DRAM (SDRAM) or Rambus DRAM (RDRAM), etc.), a static memory 506 (e.g., flash memory, static random access memory (SRAM), etc.), and a data storage system 518, which communicate with each other via a bus 530.

The processing device 502 represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. The processing device 502 can also be one or more special-purpose processing devices such as an application specific integrated circuit (ASIC), a field programmable gate array (FPGA), a digital signal processor (DSP), network processor, or the like. The processing device 502 is configured to execute instructions 526 for performing the operations and steps discussed herein. The computer system 500 can further include a network interface device 508 to communicate over the network 520.

The data storage system 518 can include a machine-readable storage medium 524 (also known as a computer-readable medium) on which is stored one or more sets of instructions 526 or software embodying any one or more of the methodologies or functions described herein. The instructions 526 can also reside, completely or at least partially, within the main memory 504 and/or within the processing device 502 during execution thereof by the computer system 500, the main memory 504 and the processing device 502 also constituting machine-readable storage media. The machine-readable storage medium 524, data storage system 518, and/or main memory 504 can correspond to the memory sub-system 110 of FIG. 1.

In one embodiment, the instructions 526 include instructions to implement functionality corresponding to voltage regulation circuitry (e.g., the voltage regulation circuitry 113 of FIG. 1). While the machine-readable storage medium 524 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general purpose computer selectively activated or reconfigured by a computer program stored in the computer. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. An apparatus, comprising:
a first voltage regulation circuit directly coupled to a voltage signal line;
a second voltage regulation circuit directly coupled to the first voltage regulation circuit and to the voltage signal line;
a delay-locked loop component, including phase detector circuitry and filter circuitry; and
control circuitry coupled to the first voltage regulation circuit and the second voltage regulation circuit, wherein the control circuitry is configured to:
determine that a signal criterion is met based, at least in part, on a determination, by the delay-locked loop component, that a rate of change in a detected current applied to a component of the apparatus has met or exceeded a threshold rate of change; and
control, based on the determination that the signal criterion is met, application of a voltage signal generated by the second voltage regulation circuit to stabilize a voltage signal generated by the first voltage regulation circuit on the voltage signal line.

2. The apparatus of claim 1, wherein the control circuitry is configured to stabilize the voltage signal generated by the first voltage regulation circuit to provide voltage drop compensation for a component coupled to the apparatus.

3. The apparatus of claim 1, wherein the control circuitry is configured to stabilize the voltage signal generated by the first voltage regulation circuit to mitigate a voltage overshoot involving a component coupled to the apparatus.

4. The apparatus of claim 1, further comprising delay circuitry coupled to the control circuitry, wherein the control circuitry is configured to:
receive signaling from the delay circuitry; and
control application of the voltage signal generated by the second voltage regulation circuit based on the signaling received from the delay circuitry.

5. The apparatus of claim 1, further comprising a voltage sensor coupled to the control circuitry, wherein the control circuitry is configured to:
receive signaling from the voltage sensor; and
control application of the voltage signal generated by the second voltage regulation circuit based on the signaling received from the voltage sensor.

6. The apparatus of claim 1, wherein the signal criterion corresponds to a change in a current associated with the apparatus or a change in a voltage associated with the apparatus, or both.

7. The apparatus of claim 6, wherein the control circuitry is further configured to control application of the voltage signal generated by the first voltage regulation circuit and application of the voltage signal generated by the second voltage regulation circuit by increasing or decreasing an output voltage of the first voltage regulation circuit or an output voltage of the second voltage regulation circuit according to a ratio that is based on a magnitude of the change in the current associated with the apparatus or the change in the voltage associated with the apparatus, or both.

8. The apparatus of claim 1, wherein the first voltage regulation circuit, the second voltage regulation circuit, and the control circuitry comprise a system-on-chip.

9. A system, comprising:
a first voltage regulation circuit directly coupled to a voltage signal line;
a second voltage regulation circuit directly coupled to the first voltage regulation circuit and to the voltage signal line;
a circuit portion area coupled via a voltage supply line to the first voltage regulation circuit and the second voltage regulation circuit;
control circuitry coupled to the first voltage regulation circuit and the second voltage regulation circuit; and
sensor circuitry coupled to the circuit portion area, wherein the sensor circuitry includes a delay-locked loop component, including phase detector circuitry and filter circuitry, wherein the sensor circuitry is configured to:
detect a change in a current or a voltage, or both, associated with the voltage supply line; and apply signaling indicative of the change in the current or the voltage, or both, associated with the voltage supply line to the control circuitry, and wherein the control circuitry is configured to control application of a voltage signal generated by the second voltage regulation circuit based, at least in part, on a determination, by the delay-locked loop component, that a rate of change in a detected current applied to a component of the apparatus has met or exceeded a threshold rate of change, to stabilize a voltage signal applied to the voltage supply line on the voltage signal line.

10. The system of claim 9, wherein the control circuitry is further configured to control application of a voltage signal generated by the first voltage regulation circuit to stabilize the voltage signal applied to the voltage supply line.

11. The system of claim 9, wherein, when the detected change in the current or the voltage, or both, comprises a detected change in the current associated with the voltage supply line, the control circuitry is further configured to:

control application of a voltage signal generated by the first voltage regulation circuit; and control application of the voltage signal generated by the first voltage regulation circuit and the second voltage regulation circuit by increasing or decreasing an output voltage of the first voltage regulation circuit and the second voltage regulation circuit according to a ratio that is based on a magnitude of the detected change in the current associated with the voltage supply line.

12. The system of claim 9, wherein, when the detected change in the current or the voltage, or both, comprises a detected change in the voltage associated with the voltage supply line, the control circuitry is further configured to:

control application of a voltage signal generated by the first voltage regulation circuit; and control application of the voltage signal generated by the first voltage regulation circuit and the second voltage regulation circuit by increasing or decreasing an output voltage of the first voltage regulation circuit and the second voltage regulation circuit according to a ratio that is based on a magnitude of the detected change in the voltage associated with the voltage supply line.

13. The system of claim 9, wherein the control circuitry is configured to control application of the voltage signal generated by the second voltage regulation circuit to stabilize the voltage signal applied to the voltage supply line to provide voltage drop compensation for the circuit portion area.

14. The system of claim 9, wherein the control circuitry is configured to control application of the voltage signal generated by the second voltage regulation circuit to stabilize the voltage signal applied to the voltage supply line to mitigate a voltage overshoot involving the circuit portion area.

* * * * *